United States Patent

Saito et al.

[11] Patent Number: 5,314,733
[45] Date of Patent: May 24, 1994

[54] MULTI-LAYER CONTAINER

[75] Inventors: Keiichi Saito; Koji Nishida, both of Mie, Japan

[73] Assignee: Mitsubishi Petrochemical Co., Ltd., Tokyo, Japan

[21] Appl. No.: 897,826

[22] Filed: Jun. 12, 1992

[30] Foreign Application Priority Data

Jun. 12, 1991 [JP] Japan ................... 3-140307

[51] Int. Cl.$^5$ .............................. B65D 1/00
[52] U.S. Cl. ................... 428/36.6; 428/36.91; 280/834; 220/562
[58] Field of Search ............ 428/35.7, 36.91, 516, 428/475.8, 476.3; 220/562, 564; 280/834, 835; 525/397, 905, 66, 92

[56] References Cited

U.S. PATENT DOCUMENTS

| | | | |
|---|---|---|---|
| 4,397,916 | 8/1983 | Magano | 428/461 |
| 4,719,135 | 1/1988 | Gerdes et al. | |
| 4,839,425 | 6/1989 | Mawatari et al. | 525/92 |
| 5,000,897 | 3/1991 | Chambers | 264/141 |
| 5,001,181 | 3/1991 | Takagi et al. | 524/401 |
| 5,039,565 | 8/1991 | Deyrup | 428/35.7 |
| 5,073,620 | 12/1991 | Sanada et al. | 525/68 |

FOREIGN PATENT DOCUMENTS 53-162342  7/1980  Japan .

*Primary Examiner*—Ellis P. Robinson
*Assistant Examiner*—Michael A. Williamson
*Attorney, Agent, or Firm*—Oblon, Spivak, McClelland, Maier & Neustadt

[57] ABSTRACT

A multi-layer container having at least layer A comprising a polyolefin resin having an MFR of from 0.001 to 0.5 dg/min, layer B (adhesive layer) comprising an $\alpha,\beta$-unsaturated carboxylic acid (or anhydride)-modified polyolefin resin, and layer C comprising polyamide, polyphenylene ether, a compatibilizer, and an impact modifier, in which the polyphenylene ether is finely dispersed in the polyamide matrix. The container has excellent impermeability to hydrocarbon solvents and low-temperature impact resistance and is useful particularly as a gasoline tank.

11 Claims, No Drawings

MULTI-LAYER CONTAINER

BACKGROUND OF THE INVENTION

The present invention relates to a multi-layer container made of thermoplastic resins, having excellent low-temperature impact resistance, gas barrier properties, and impermeability to hydrocarbon solvents. The container of the present invention may be used in a variety of applications, such as a gasoline tank, an oil tank, or a reserve tank for automobiles, an oil tank for electric or electronic FA equipment, a food container, a drum for an industrial reagent, a storage tank, or a kerosene tank.

BACKGROUND OF THE INVENTION

With the recent trends to weight reduction and safety improvement in the production of automobiles, gasoline tanks made of resins have been examined as replacements for tanks made from metal, and some of these resin-based tanks are about to put to practical use.

In particular, blow-molded containers are considered the most suitable for compact body design. Because there is no fear of leakage of the tank's contents and the tank may be easily produced having a complicated shape. These blow-molded tanks are expected to be rapily developed. Polyolefin resins, which are easy to mold and have high impact strength have been extensively studied, especially ultra-high-molecular weight polyethylene. However, when a polyolefin resin is used as a single-layered article, the layer must have a thickness of at least 8 to 10 mm due to its unacceptable permeability to organic solvents. This counters the effect on weight reduction when compared with the weight of a metal tank of the same volume.

Known methods for providing a polyolefin container with gas barrier properties or impermeability to hydrocarbon solvents, such as gasoline and kerosene, include treatment of the inner wall of the polyolefin container with $SO_3$ or fluorine, or lamination of a polyamide resin film having satisfactory gas barrier properties as an inner or intermediate layer to provide a multi-layer container (*NIKKEI MECHANICAL, DEC,* Vol. 20, p. 50 (1982)). Further, it has been proposed to co-extrude a polyolefin resin and a specific polyamide resin to provide a discontinuous composite layer as a barrier layer as disclosed in JP-B-60-14695, JP-A-58-85994, JP-A-58-85994, JP-A-58-168525, and JP-A-58-209562 (the term "JP-B" as used herein means an "examined published Japanese patent application", and the term "JP-A" as used herein means an "unexamined published Japanese patent application"). Some of these methods are now in an advanced stage for practical application.

Additionally, a hollow container has been proposed which has a three layer structure composed of a polypropylene outer layer, a maleic anhydride-grafted polyolefin adhesive layer, and a polyamide inner layer as disclosed in JP-A-62-158654.

However, the above-described treatment with $SO_3$ or fluorine causes contamination of the working environment. Lamination of the polyamide film results in a reduction in low-temperature impact resistance, thus causing a safety problem which would require further study. A conventional method for improving the low-temperature impact resistance of a polyamide is to incorporate, into the polyamide, an elastomeric component. While this may provide an improvement in low-temperature impact resistance, this method has not been adopted in the production of containers for organic solvents because the elastomer component is likely to be swollen by the organic solvents, resulting in the failure to obtain the desired barrier properties. Further, the above-mentioned polyamide resin comprises a component essentially compatible with the polyolefin resin and a component incompatible with the polyolefin resin thus forming a discontinuous barrier layer with the polyolefin resin. In this case also, an improvement in low-temperature impact resistance is needed.

SUMMARY OF THE INVENTION

An object of the present invention is to provide a multi-layer container which exhibits excellent low-temperature impact resistance while retaining the essential ability to provide gas barrier properties and impermeability to organic hydrocarbon solvents.

Extensive investigation has been conducted to improve the low-temperature impact resistance of the polyamide layer contained in a multi-layer hollow container. As a result, it has been found that a layer comprising a polyamide resin, a polyphenylene ether resin, an impact modifier, and a compatibilizer for both resins, with the polyamide resin and polyphenylene ether resin forming a specific microstructure, accomplishes the above object of the present invention without causing a reduction in impermeability to hydrocarbon solvents, such as gasoline.

These and other objects have been satisfied by a multi-layer container composed of layer A comprising a polyolefin resin having a melt flow rate (190° C., 2.16 kg, hereinafter abbreviated as MFR) of from 0.001 to 0.5 dg/min, layer B comprising a polyolefin resin which has been modified with an $\alpha,\beta$-unsaturated carboxylic acid or an anhydride thereof, and layer C comprising a resin composition comprising (C-1) from 40 to 90 parts by weight of a polyamide resin (hereinafter abbreviated as PA) and (C-2) from 10 to 60 parts by weight of a polyphenylene ether resin (hereinafter abbreviated as PPE) having incorporated therein (C-3) from 5 to 50 parts by weight of an impact modifier and (C-4) from 0.05 to 30 parts by weight of a compatibilizer, each per 100 parts by weight of the sum of (C-1) and (C-2), in which the PPE forms a dispersed phase having a number average particle size of not more than 1 $\mu$m, and the PA forms a continuous phase and has a crystallinity of at least 20%, wherein the layers are in the order A/B/C or A/B/C/B/A.

DETAILED DESCRIPTION OF THE INVENTION

The polyolefin resin constituting layer A is a high-molecular weight polyolefin having an MFR of from 0.001 to 0.5 dg/min, preferably from 0.01 to 0.2 dg/min, as measured at 190° C. under a load of 2.16 kg (ASTM D1238). Suitable polyolefin resins include ethylene-based resins such as an ethylene homopolymer, an ethylene-propylene copolymer, and an ethylene-butene-1 copolymer, propylene-based resins such as a propylene homopolymer, an ethylene-propylene block copolymer, an ethylene-propylene-butene copolymer, polybutene, poly-4-methylpentene-1, poly-3-methylpentene-1, and a propylene-4-methylpentene-1 copolymer. Preferred of them are ethylene-based resins, especially those having a density of from 0.925 to 0.970 g/cm$^3$, such as an ethylene homopolymer and copolymers of ethylene and $\alpha$-olefins having from 3 to 12 carbon atoms, such as propylene, 1-butene, 4-methyl-1-pentene, 1-hexene, or 1-octene. Particularly preferred polyolefin resins are copolymers of ethylene and 1-butene, 1-hexene, 1-octene, or 4-methyl-1-pentene. Such ethylene-based resins may be prepared by slurry polymerization, gaseous phase polymerization or solution polymerization by using a Ziegler-Natta catalyst, a chromium oxide catalyst, or a Kaminsky catalyst. For the details of the ethylene-based resin preparation, reference can be made to JP-B-44-2996, JP-B-47-1365, JP-B-61-42736, JP-B-1-12777, and JP-A-12781.

Additionally, linear ethylene-based resins comprising ethylene and an α-olefin having from 4 to 12 carbon atoms may be mixed with middle- to high-density polyethylene in order to achieve the above-noted density. In this case, it is especially recommended that the linear ethylene-based resin to be blended should have a MFR equal to or lower than that of the middle- to high-density polyethylene.

If the density of the ethylene-based resin is less than 0.925 g/cm$^3$, the container, such as a gasoline tank, is subject to deformation due to poor rigidity under reduced pressure. If it exceeds 0.970 g/cm$^3$, impact strength is reduced. If the MFR of the polyolefin resin is less than 0.001 dg/min, the rate of parison extrusion in molding is reduced. If it exceeds 0.5 dg/min, the parison drawdown becomes high, causing the resultant container to have a smaller wall thickness than desired and to be more likely to be broken due to localized stresses.

Layer A forms a proportion of from 50 to 99% to the total wall thickness of the container depending on the required end use. For example, layer A usually has a thickness of from 3 to 8 mm in a gasoline tank or from 0.3 to 1 mm in a 1 l-volume oil tank.

Layer B serves as an adhesive layer. The modified polyolefin constituting layer B is a polyolefin modified with an α,β-unsaturated carboxylic acid or an anhydride thereof. Examples of suitable polyolefins to be modified are a propylene-based resin or an ethylene-based resin such as an ethylene-vinyl acetate copolymer, an ethylene-propylene copolymer, and an ethylene-1-butene copolymer. The degree of modification of the polyolefin, as measured by the content of the unsaturated carboxylic acid or anhydride thereof in the modified polyolefin, preferably ranges from 0.01 to 5% by weight, more preferably from 0.03 to 1.5% by weight, and most preferably from 0.05 to 1.0% by weight. If it is less than 0.01% by weight, the adhesion strength between layers A and C is reduced. If it exceeds 5% by weight, layer B causes a reduction in the crystallinity of the PA in adjacent layer C.

The modified polyolefin resin preferably has an MFR of from 0.001 to 20 dg/min, more preferably from 0.01 to 10 dg/min, and most preferably from 0.2 to 5 dg/min. If the MFR is less than 0.001 dg/min, cuts may occur in layer B during extrusion-blowing, resulting in local adhesion failure.

Suitable α,β-unsaturated carboxylic acids or the anhydride thereof as modifiers of polyolefin resins include acrylic acid, maleic acid, fumaric acid, itaconic acid, maleic anhydride, and crotonic acid, with acrylic acid and maleic anhydride being preferred. Modification of the polyolefin resin may be effected by grafting, in a dissolved or molten state, in the presence of a peroxide or under heat. Additionally a highly concentrated modified polyolefin may be diluted with a second polyolefin so as to have a degree of modification within the range of from 0.01 to 5% by weight. For details regarding the modification techniques, one may refer to JP-B-57-13563, JP-B-57-13564, JP-B-52-30546, and JP-B-52-39636.

Layer B forms a proportion of from 0.1 to 10% to the total wall thickness of the container. The thickness of layer B is usually from 4 μm to 2 mm and preferably from 8 to 40 μm in a gasoline tank.

Layer C is made of a resin composition comprising (C-1) from 40 to 90 parts by weight of a PA, (C-2) from 10 to 60 parts by weight of a PPE, (C-3) from 5 to 50 parts by weight, per 100 parts by weight of the sum of (C-1) and (C-2), of an impact modifier, and (C-4) from 0.05 to 30 parts by weight, per 100 parts by weight of the sum of (C-1) and (C-2), of a compatibilizer. In layer C, the PPE dispersed phase has a number average particle size of not more than 1 μm, and the PA continuous phase has a crystallinity of at least 20%.

Layer C forms a proportion of from 0.8 to 49.9% to the total wall thickness of the container. The thickness of layer C may be from 40 μm to 3 mm in a gasoline tank.

The PA content of layer C ranges from 40 to 90% by weight, preferably from 55 to 80% by weight, and more preferably from 60 to 75% by weight based on the total of the thermoplastic resins (PA +PPE). If the PA content is less than 40%, layer C has poor gas barrier properties. A PA content exceeding 90% results in insufficient impact strength.

Examples of polyamides (PA) which may be used as component (C-1) include nylon 4, nylon 6, nylon 66, nylon 610, nylon 8, nylon 10, nylon 11, nylon 12, and nylon 46. These polyamide resins may be used either individually or in combinations of two or more. Further, polymer blends of known aromatic polyamide resins may be used as long as a crystallinity of 20% or higher is maintained. The PA has a preferred crystallinity of from 30 to 70%.

Of the above-mentioned polyamide resins, nylon 6, nylon 66, and nylon 8 are preferred. These resins are commercially available.

The PA to be used in the present invention preferably has a relative viscosity of not less than 2.0, preferably from 2.0 to 8.0, and more preferably from 2.5 to 7.0, as measured according to JIS K6810 (in 98% sulfuric acid at 25° C.). If the relative viscosity is less than 2.0, molding strains occur due to a difference of viscosity among multiple layers, and the resultant container has reduced low-temperature impact resistance. If it exceeds 8.0, the ductility of the resin composition is reduced to cause film cutting on extrusion-blowing.

The PPE which can be used in the present invention is a polymer comprising a repeating unit represented by formula (I):

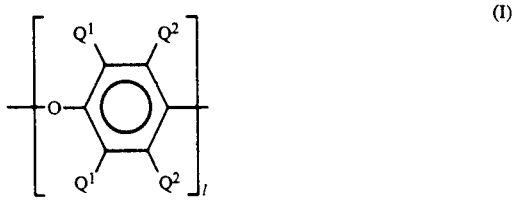

wherein $Q^1$ and $Q^2$ each represents a hydrogen atom, a halogen atom, a $C_1$–$C_{20}$-hydrocarbon group containing no tertiary α-carbon atom, a halogenated $C_1$–$C_{20}$-hydrocarbon group having at least two carbon atoms between a halogen atom and a phenyl nucleus, a $C_1$–$C_{20}$-hydrocarbon oxy group, or a halogenated $C_1$–$C_{20}$-hydrocarbon oxy group having at least two carbon atoms between a halogen atom and a phenyl nucleus; and l represents an integer of at least 50, the ether oxygen atom per unit being bonded to the benzene nucleus of the adjacent unit.

Since the dispersed particle size of the PPE dispersed phase has a great influence on the gas barrier properties of layer C, the dispersed particle size should be 1 μm or less and is preferably from 0.15 to 1 μm. If it is greater than 1 μm, the gas barrier properties become worse with changes in PA to PPE ratio. With an average PPE particle size being not more than 1 μm, gas barrier properties on the level equal to polyamides can be maintained. Further, the gas barrier properties can be further improved by maintaining the crystallinity of PA at 20% or higher.

Typical examples of the PPE are poly(2,6-di-methyl-1,4-phenylene)ether, poly(2,6-diethyl-1,4-phenylene)ether, poly(2-methyl-6-ethyl-1,4-phenylene)ether, poly(2-methyl-6-propyl-1,4-phenylene)ether, poly(2,6-dipropyl-1,4-phenylene)ether, poly(2-ethyl-6-propyl-1,4-phenylene)ether, poly(2,6-dibutyl-1,4-phenylene)ether, poly(2,6-dipropenyl-1,4-phenylene)ether, poly(2,6-di-lauryl-1,4-phenylene)ether, poly(2,6-diphenyl-1,4-phenylene)ether, poly(2,6-dimethoxy-1,4-phenylene)ether, poly-2,6-diethoxy-1,4-phenylene)ether, poly(2-methoxy-6-ethoxy-1,4-phenylene)ether, poly(2-ethyl-6-stearyloxy-1,4-phenylene)ether, poly(2,6-dichloro-1,4-phenylene)ether, poly(2-methyl-6-phenyl-1,4-phenylene)ether, poly(2,6-dibenzyl-1,4-phenylene)ether, poly(2-ethoxy-1,4-phenylene)ether, poly(2-chloro-1,4-phenylene)ether, poly(2,5-dibromo-1,4-phenylene)ether, and analogues thereof. Copolymers, such as a 2,6-dimethylphenol/2,3,6-trimethylphenol copolymer, a 2,6-dimethylphenol/2,3,5,6-tetramethylphenol copolymer, and a 2,6-diethylphenol/-2,3,6-trimethylphenol copolymer, may also be used. In addition, a modified PPE, such as PPE comprising the repeating unit (I) to which a styrene-based monomer (e.g., styrene, p-methylstyrene, and α-methylstyrene) is grafted, may also be used as the PPE component. Processes for preparing the above-mentioned PPE are described, e.g., in U.S. Pat. Nos. 3,306,874, 3,306,875, 3,257,357, and 3,257,358, JP-B-52-17880, and JP-A-50-51197.

The PPE to be used has an intrinsic viscosity of from 0.25 to 0.90 dl/g, preferably from 0.3 to 0.7 dl/g, and more preferably from 0.35 to 0.6 dl/g (in chloroform at 30° C.). If the intrinsic viscosity is less than 0.25 dl/g, the resulting molded article has reduced mechanical properties. If it exceeds 0.90 dl/g, the resin composition may have poor moldability.

If desired, the PPE component may contain up to 50% by weight of one or more polystyrene-based resins, such as polystyrene, high-impact polystyrene, an acrylonitrile-styrene copolymer, an acrylate-styrene copolymer, an acrylonitrile-styrene-butadiene copolymer, or a styrenemaleic anhydride copolymer.

The impact modifier (component C-3) which can be used in layer C may include an elastomer, such as an aromatic alkenyl compound-conjugated diene block copolymer, an ethylene-α-olefin copolymer elastomer, an ethylene-α-olefin terpolymer, a styrene-grafted ethylene-α-olefin elastomer, or a core/shell elastomer comprising crosslinked polybutadiene or crosslinked polybutyryl acrylate as a core and polyacrylate or polystyrene as an outer shell.

The impact modifier is added in an amount of from 5 to 50 parts by weight, preferably from 10 to 50 parts by weight, and more preferably from 5 to 35 parts by weight, per 100 parts by weight of the total thermoplastic resins (PA+PPE). With less than 5 parts of the impact modifier, the impact strength of the container is low. While the addition of levels of an impact modifier higher than 50 parts by weight will provide further improved impact strength, this causes the elastomeric component to be present in the continuous phase to make the PA phase susceptible to swelling with organic solvents.

The aromatic alkenyl compound-conjugated diene block copolymer is represented by formula (II):

$$A—B(—A—B—)_m—(A)_n \quad (II)$$

wherein A is a polymer block derived from an aromatic alkenyl compound; B is an elastomeric block copolymer of a conjugated diene; m is 0 or a positive integer of 1 to 3; and n is 0 or 1.

The aromatic alkenyl compound constituting polymer block A may include styrene, α-methylstyrene, vinyltoluene, other lower alkyl-substituted styrene monomers, or vinylnaphthalene, with styrene being preferred. The conjugated diene in polymer block B may include butadiene, isoprene, or a mixture of butadiene and isoprene, with butadiene being preferred. The conjugated diene component may contain cyclopentadiene or a derivative thereof or a lower alkyl-substituted butadiene, such as 2,3-dimethylbutadiene. The diene component may further contain an olefinic hydrocarbon, such as ethylene, propylene, and 1-butene, or a non-conjugated diene, as long as the elastomeric properties of polymer block A are not considerably impaired.

Polymer block A has a weight average molecular weight of from 500 to 125,000, preferably from 5,000 to 110,000, and polymer block B has a weight average molecular weight of from 15,000 to 250,000, preferably from 15,000 to 220,000. The block copolymer may contain, in parts, a polymer block A or B of lower molecular weight. The component derived from the aromatic alkenyl compound is preferably present in the block copolymer in an amount of from 15 to 50% by weight. If the amount is not within this range, the resulting molded article tends to have insufficient impact strength. A part of the double bonds derived from the conjugated diene may be hydrogenated to a degree of not more than 90%. The block copolymer may be a mixture of two or more different species.

Particularly preferred impact modifiers are the above-mentioned aromatic alkenyl compound-conjugated diene block copolymer or a partial hydrogenation product thereof, an α,β-unsaturated carboxylic acid (or anhydride)-modified ethylene-α-olefin copolymer elastomer, and an α,β-unsaturated carboxylic acid (or anhydride)-modified ethylene-α-olefin terpolymer. In particular, a mixture of the aromatic alkenyl compound-conjugated diene block copolymer or a hydrogenation product thereof and the modified ethylene-α-olefin copolymer elastomer or ethylene-α-olefin terpolymer at a weight mixing ratio of from 20/80 to 80/20 provides satisfactory impact strength in good balance with gas barrier properties attributable to the crystallinity of the PA.

The compatibilizer (component (C-4)) which can be used in the present invention may include any compound capable of compatibilization between PA and PPE. Among them, those having at least one each of (a) an unsaturated group and (b) an amidophilic group per molecule are preferred.

The compatibilizers may contain two or more of the groups (a), which may be the same or different, and two or more of the groups (b), which may be the same or different, per molecule.

The compatibilizer is added in an amount of from 0.05 to 30 parts by weight, preferably from 0.1 to 15 parts by weight, and more preferably from 0.2 to 5 parts by weight, per 100 parts by weight of the total thermoplastic resins (PA+PPE). Amounts less than 0.05 part produce only a small improvement in impact strength. Addition of more than 30 parts produces no further effect, and causes contamination of the contents of the container, such as gasoline.

The unsaturated group (a) of the compatibilizer may include a carbon-to-carbon double bond or a carbon-to-carbon triple bond. The terminology "amidophilic group" as used herein means a functional group showing affinity to or chemical reactivity with the amido linkage (contained in PA) or a carboxyl group or an amino group (present at the chain terminals of PA). Examples of such amidophilic groups are a carboxyl group, groups derived from a carboxyl group, such as salts, esters, acid amides, acid anhydrides, acid imides, acid azides, and acid halides, an oxazoline residue, a nitrile group, an epoxy group, an amino group, a hydroxyl group, and an isocyanic acid ester group. Compounds having both functional groups (a) and (b) include unsaturated carboxylic acids, unsaturated carboxylic acid derivatives, unsaturated epoxy compounds, unsaturated alcohols, unsaturated amine compounds, and unsaturated isocyanic esters.

Specific examples of these compounds include maleic anhydride, maleic acid, fumaric acid, maleimide, maleic hydrazide, a reaction product of maleic anhydride and an aliphatic or aromatic diamine, methylnudic anhydride, dichloromaleic anhydride, maleinamide, itaconic acid, itaconic anhydride, natural fats and oils (e.g., soybean oil, tung oil, castor oil, linseed oil, hemp-seed oil, cotton seed oil, sesame oil, rape oil, peanut oil, camellia oil, olive oil, coconut oil, and sardine oil), epoxidized natural fats and oils (e.g., epoxidized soybean oil), unsaturated carboxylic acids (e.g., acrylic acid, butenoic acid, crotonic acid, vinylacetic acid, methacrylic acid, pentenoic acid, angelic acid, tiglic acid, 2-pentenoic acid, 3-pentenoic acid, α-ethylacrylic acid, α-methylcrotonic acid, 4-pentenoic acid, 2-hexenoic acid, 2-methyl-2-pentenoic acid, 3-methyl-2-pentenoic acid, α-ethylcrotonic acid, 2,2-dimethyl-3-butenoic acid, 2-heptenoic acid, 2-octenoic acid, 4-decenoic acid, 9-undecenoic acid, 10-undecenoic acid, 4-dodecenoic acid, 9-tetradecenoic acid, 9-hexadecenoic acid, 2-octadecenoic acid, 9-octadecenoic acid, eicosenoic acid, docosenoic acid, erucic acid, tetracosenoic acid, mycolipenic acid, 2,4-pentadienoic acid, 2,4-hexadienoic acid, diallylacetic acid, geranic acid, 2,4-decadienoic acid, 2,4-dodecadienoic acid, 9,12-hexadecadienoic acid, 9,12-octadecadienoic acid, hexadecatrienoic acid, linoleic acid, linolenic acid, octadecatrienoic acid, eicosadienoic acid, eicosatrienoic acid, eicosatetraenoic acid, ricinoleic acid, eleostearic acid, oleic acid, eicosapentaenoic acid, escinic acid, docosadienoic acid, docosatrienoic acid, docosatetraenoic acid, docosapentaenoic acid, tetracosenoic acid, hexacosenoic acid, hexacodienoic acid, octacosenoic acid, and triacontenoic acid) and esters, acid amides or anhydrides of these unsaturated carboxylic acids, unsaturated amines derived by substituting a hydroxyl group of unsaturated alcohols (e.g., allyl alcohol, crotyl alcohol, methylvinylcarbinol, allylcarbinol, methylpropenylcarbinol, 4-penten-1-ol, 10-undecen-1-ol, propargyl alcohol, 1,4-pentadien-3-ol, 1,4-hexadien-3-ol, 3,5-hexadien-2-ol, 2,4-hexadien-1-ol, unsaturated aliphatic alcohols, 3-butene-1,2-diol, 2,5-dimethyl-3-hexene-2,5-diol, 1,5-hexadiene-3,4-diol, 2,6-octadiene-4,5-diol) with —NH$_2$, and diene polymers, such as those of butadiene or isoprene, to which maleic anhydride or a phenolic compound is added or into which a functional group, such as an amino group, a carboxylic group, a hydroxyl group, or an epoxy group, is introduced.

If desired, the resin composition of layer C may contain, in addition to components (C-1) to (C-4), other compounding additives, such as antioxidants, flame retardants, pigments, dyes, weathering agents, and antistatic agents.

The resin composition may be prepared by various blending methods, such as blending all the resin components, blending a resin component with a stabilizer and a colorant, or blending a resin component with a filler. For example, powdered or granulated components are uniformly mixed in a mechanical mixing apparatus, such as a Henschel mixer, a ribbon blender, a twin-cylinder mixer, or a Naughter mixer, and the resulting dry blend is melt-kneaded at a temperature of from 180° to 370° C., preferably from 230° to 300° C., in a general kneading machine, such as a single-screw extruder, a twin-screw extruder, a Banbury mixer, a roll, or a kneader. The resultant molten resin mixture may be pelletized. The melt-kneading step may be carried out on all components simultaneously or in two or more stages. For example, PPE may first be melt-kneaded with a compatibilizer, and PA then added, followed by further kneading, or PPE, a compatibilizer, and part of PA may be melt-kneaded to synthesize a PPE-PA block copolymer in a dissolved or molten state, and the rest of PA and the other desired components added, followed by further kneading.

The crystallinity of the PA in layer C is very important in the present invention. That is, the PA continuous phase in layer C should have a crystallinity of at least 20%, preferably from 30 to 70%, and more preferably from 30 to 50%. If the PA crystallinity is less than 20%, the gas barrier properties are reduced.

The crystallinity of PA on the surface of a resin molded article can be determined by analysis of an X-ray diffraction pattern ($2\theta = 5°$ to $35°$) of a cut area of the article, obtained by use of an X-ray generating apparatus "RU-200" and an X-ray diffractometer "RMG-A2" both manufactured by Rigaku Denki K.K. Specifically, the background and amorphous halo of PPE are first subtracted from the peak intensity. Then the intensity (A) corresponding to the diffraction assigned to the amorphous region of PA, having a peak at $2\theta = 20°$, is further subtracted to obtain a diffraction intensity corresponding only to the crystalline region. Then, the diffraction intensities corresponding to the α crystal form of PA having peaks at $2\theta = 20°$ (B) and $2\theta = 24°$ (C) and the diffraction intensity corresponding to the γ crystal form of PA having a peak at $2\theta = 21°$ (D) are separated by Gaussian peak separation to obtain the respective peak area. Crystallinity (%) can be calculated from the resulting peak areas according to equation (i):

$$\text{Crystallinity} = \frac{\{(B) + (C) + (D)\} \times 100}{(A) + (B) + (C) + (D)} \quad \text{(i)}$$

The gas barrier properties and gasoline impermeability of the container can be obtained by appropriately controlling the size of the dispersed PPE in the PA continuous phase. This layer C microstructure can be determined by observing a sliced sample stained with a transition metal oxide, such as osmium tetroxide or ruthenium tetroxide, under a transmission electron microscope (e.g., "JEM-100CX" manufactured by Japan Electron Optics Laboratory Co., Ltd.). Each selectively stained polymer component in the resin molded article can be photographically discriminated. The micrograph of the slice is analyzed by an image analyzer (e.g., "SPICA II" manufactured by Nippon Avionics K.K.) to determine the size of the dispersed particles.

The desired microstructure of layer C can be achieved by the appropriate selection of a combination of various factors, such as the chemical structure and molecular weight of each component, the method and conditions of blending, the method and conditions of molding, the types and amounts of various additives, and the degree of modification of the polyolefin in layer B.

The multi-layer structure of the container according to the present invention is basically composed of three layers in the order of layer A (polyolefin resin), layer B ($\alpha,\beta$-unsaturated carboxylic acid (or anhydride)-modified polyolefin resin), and layer C (PA/PPE composition). Either of layers A and C may be the outer layer to obtain excellent gas barrier properties and high impact strength. In general, a structure with layer A as the outermost layer and layer C as the innermost layer is preferred from the standpoint of ease of imparting weather resistance to layer A and excellent chemical resistance of layer C.

Where the container is produced by blow molding, existence of a polyolefin layer at the pinch-off tail is advantageous for obtaining high pinch-off strength. In this case, the container preferably has a structure composed of five layers in the order of A/B/C/B/A. Where the scrap, such as flash, is reused as recycle D, the container may have a six layer structure composed of A/(D+B)/B/C/B/D, or a seven layer structure composed of A/(D+B)/B/C/B/(D+B)/A. In these embodiments, layer D or layer (D+B) may have the same thickness as layer B.

The multi-layer container of the present invention can be obtained by molding methods generally used for thermoplastic resins, such as injection molding (including multi-layer injection molding and sandwich injection molding), extrusion (including in-die extrusion lamination, out-of-die extrusion lamination, and sheet blowing), press molding, blow molding, rotational molding (the resin as outermost layer is first shaped by melting, and then the other resins shaped successively), and vacuum forming of a laminate sheet. These methods may be used singly or in combination. For example, a resin layer may be formed by injection molding on an article obtained by vacuum forming of an extruded sheet.

Typical conditions of blow molding for producing gasoline tanks are 170° to 280° C. in temperature of the polyolefin resin (layer A), 160° to 280° C. in temperature of the modified polyolefin resin (layer B), and 200° to 300° C. in temperature of the PA/PPE composition (layer C). The mold temperature is preferably set between 30° C. and 120° C. for maintaining the PA crystallinity of 20% or more.

The container according to the present invention is excellent in gas barrier properties, impact strength, and reusability and is therefore useful in a wide variety of applications, such as a gasoline tank, an oil tank, and a reserve tank in automobiles, an oil tank in electric or electronic FA equipment, a tank or drum of foodstuffs for commercial use, a drum for industrial chemicals, and an outdoor storage tank for industrial or agricultural use.

The $\alpha,\beta$-unsaturated carboxylic acid (or anhydride)-modified polyolefin of layer B shows excellent affinity to both of the polyolefin of layer A and the PA/PPE composition of layer C. Accordingly, layer B has a high fusion bonding force resulting in no layer separation. The PA/PPE composition of layer C serves to provide gas barrier properties and hydrocarbon solvent impermeability. While compounding of an impact modifier into PA for improving low-temperature impact resistance of PA may also cause a reduction in the gas barrier properties of PA, this can be avoided in the present invention by addition of PPE and a compatibilizer.

Having generally described this invention a further understanding can be obtained by reference to certain specific examples which are provided herein for purposes of illustration only and are not intended to be limiting unless otherwise specified. All the parts, percents, and ratios are given by weight unless otherwise indicated.

EXAMPLES 1 TO 7 AND COMPARATIVE EXAMPLES 1 TO 8

Resin compounds for layers A, B, and C were prepared as follows.

High-Molecular Weight Polyethylene as Layer A

"SHOWLEX SUPER 4551H" (a high-molecular weight high-density ethylene-1-butene copolymer powder produced by Showa Denko K.K.) was melt-kneaded at 240° C. in an extruder (diameter: 40 mm; L/D: 30) under nitrogen seal to obtain strands. After being cooled with water, the strands were cut to pellets. The resulting pellets had a density of 0.946 g/cm$^3$ and an MFR of 0.02 dg/min.

$\alpha,\beta$-Unsaturated Carboxylic Acid-Modified Polyolefin as Layer B 100 parts of "MITSUBISHI POLYETHY LL" (linear middle-density ethylene-1-butene copolymer powder produced by Mitsubishi Petrochemical Co., Ltd.; density: 0.935 g/cm$^3$; MFR: 5 dg/min; butene-1 content: 1.7%) were dry blended with 0.8 part of benzoyl peroxide and 1.2 part of maleic anhydride in a Henschel mixer. The blend was melt-kneaded at 210° C. in an extruder (diameter: 100 mm; L/D: 28) to obtain strands, which were cooled with water and cut to pellets.

The resulting modified ethylene copolymer was dissolved in boiling xylene and reprecipitated in a large quantity of acetone. The infrared absorption spectrometry of the precipitate revealed addition of 1.2% of maleic anhydride to the middle-density ethylene copolymer.

Maleic anhydride-modified ethylene copolymers having a degree of modification of 1.2% and 6.0% were also prepared in the same manner as described above, by changing the amount of maleic anhydride added.

Ten parts of each of the resulting modified ethylene copolymers and 90 parts of "MITSUBISHI POLYETHY HD" (high-density ethylene-propylene copolymer produced by Mitsubishi Petrochemical Co., Ltd.; density: 0.950 g/cm$^3$; MFR: 0.5 dg/min; propylene content: 0.8%) were melt-kneaded in an extruder at 210° C. and extruded from the die into strands, which were cooled with water and then cut to pellets.

PA/PPE Resin Composition as Layer C

Prescribed amounts of the components shown in Table 1 or 2 below were thoroughly mixed by stirring in a Henschel mixer. The blend was melt-kneaded in a twin-screw extruder "TEX 44" (manufactured by Japan Steel Works, Ltd.; L/D: 30) at 280° C. and 350 rpm, extruded through the die into strands. After cooling, the strands were cut to pellets.

A blow molding machine of in-die 5-layer laminating type "NB60G" (manufactured by Japan Steel Works, Ltd.; screw diameter: 65 mm; L/D: 25) was used for blow molding. The high-molecular weight ethylene copolymer (layer A) was put in the main barrel, the modified polyethylene (layer B) was put in the side barrel (screw diameter: 40 mm; L/D: 22), and the PA/PPE composition (layer C) was put in the other side barrel of the same size, and were melt-kneaded at 240° C., 240° C., and 260° C., respectively, and co-extruded through the same ring die to provide a parison having a five-layer structure of A/B/C/B/A.

The parison was expanded under a blow pressure of 6 kg/cm$^2$G in a mold set at a temperature shown in Table 1 or 2 and cooled for 6 minutes to obtain a 60 l-volume tank having a 5-layered wall structure (A/B/C/B/A=1.8/0.02/0.02/0.02/1.8 mm).

A disc of 152.86 mm in diameter was cut out of the flat part of the tank to prepare a specimen for measurement of gasoline permeability and low-temperature impact strength.

1) Measurement of Gasoline Permeability

A gasoline tank made of SUS 304 was filled with 400 ml of regular gasoline produced by Shell Kosan K.K., and the top opening was sealed with the disc. The closed tank was put in a dry box under nitrogen seal, and the box was left to stand in a room conditioned at 23° C. for 5 months. The gasoline permeability was evaluated by determining the gas volatilized from the closed tank through the disc by means of a gas chromatograph ("Gas Chromatogram 5890" manufactured by Yokogawa Hewlett Packard Co., Ltd.) using a capillary column packed with 5% phenylmethylsilicone. The integrated amount of benzene, toluene, m-xylene, and p-xylene components was taken as the amount of permeated gasoline.

2) Measurement of Low-Temperature Impact Strength

The impact strength of the disc specimen was measured by means of a high rate falling weight tester manufactured by Shimazu Seisakusho K.K. under conditions of a sample holder diameter of 1 inch, a striking bar diameter of ⅜", a striking speed of 2.5 m/sec, and a temperature of −40° C. The maximum stress at crack initiation was taken as a low-temperature impact strength.

Further, the microstructure of layer C of the above obtained tank was determined as follows.

3) Crystallinity of PA Phase

A cut surface of layer C of the tank was examined by the method previously described to determine the crystallinity of the PA phase.

4) Particle Size of PPE Dispersed Phase

A cut piece of layer C of the tank was stained with osmium tetroxide and sliced. The slice was observed under a transmission electron microscope ("JEM-100CX" manufactured by Japan Electron Optics Laboratory Co., Ltd.). Each selectively stained polymer component in layer C could be photographically discriminated. The micrograph of the slice was analyzed by an image analyzer ("SPICA II" manufactured by Nippon Avionics K.K.) to determine the size of 200 dispersed particles per sample. An average particle size was obtained according to equation (ii):

$$\text{Average Particle Size} = \sum_{i=1}^{n} D_i N_i / \sum_{i=1}^{n} N_i \quad \text{(ii)}$$

wherein $D_i$ is a diameter of PPE particles; and $N_i$ is a number of the particles.

The results of the measurements and analyses are shown in Tables 1 and 2.

TABLE 1

|  | Example 1 | Example 2 | Example 3 | Example 4 | Example 5 | Example 6 | Example 7 |
|---|---|---|---|---|---|---|---|
| Layer A: |  |  |  |  |  |  |  |
| MFR of High-Molecular Weight Ethylene Copolymer (dg/min) | 0.02 | 0.02 | 0.02 | 0.02 | 0.02 | 0.02 | 0.02 |
| Layer B: |  |  |  |  |  |  |  |
| Degree of Modification of Maleic Anhydride-modified Ethylene Copolymer (wt %) | 0.12 | 0.12 | 0.12 | 0.12 | 0.12 | 0.12 | 1.2 |
| Layer C: |  |  |  |  |  |  |  |
| PA: Kind (relative viscosity) | PA-a[1] (6.8) | PA-a (6.8) | PA-a (6.8) | PA-b[2] (5.0) | PA-c[3] (2.5) | PA-a (6.8) | PA-a (6.8) |
| Amount (part) | 80 | 80 | 65 | 80 | 50 | 20 | 20 |
| PPE[4]: Amount (part) | 20 | 20 | 35 | 20 | 50 | 80 | 80 |
| Intrinsic Viscosity (dl/g) | 0.51 | 0.51 | 0.51 | 0.51 | 0.41 | 0.51 | 0.51 |
| Impact Modifier-a[5] (part) | 5 | 5 | 5 | 5 | 5 | 15 | 5 |
| Impact Modifier-a[6] (part) | 15 | 15 | 15 | 15 | 15 | 5 | 15 |
| Compatibilizer[7] (part) | 0.7 | 0.7 | 0.7 | 0.7 | 0.7 | 0.7 | 0.7 |
| PPE Particle Size (μm) | 0.15 | 0.15 | 0.39 | 0.66 | 0.51 | 0.33 | 0.15 |
| Blow Mold Temperature (°C.) | 30 | 90 | 30 | 30 | 30 | 30 | 30 |
| Crystallinity of PA Phase (%) | 38 | 47 | 37 | 7 | 33 | 42 | 34 |
| Gasoline Permeability (μg) | 0.41 | 0.33 | 0.44 | 0.28 | 0.60 | 0.44 | 0.45 |

TABLE 1-continued

|  | Example 1 | Example 2 | Example 3 | Example 4 | Example 5 | Example 6 | Example 7 |
| --- | --- | --- | --- | --- | --- | --- | --- |
| Impact Strength (kgf) | 1550 | 1400 | 1650 | 1280 | 1360 | 1480 | 1600 |

TABLE 2

|  | Compar. Example 1 | Compar. Example 2 | Compar. Example 3 | Compar. Example 4 | Compar. Example 5 | Compar. Example 6 | Compar. Example 7 | Compar. Example 8 |
| --- | --- | --- | --- | --- | --- | --- | --- | --- |
| Layer A: |  |  |  |  |  |  |  |  |
| MFR of High-Molecular Weight Ethylene Copolymer (dg/min) | 0.02 | 0.02 | 0.02 | 0.02 | 0.02 | 0.5 | 0.02 | 0.02 |
| Layer B: |  |  |  |  |  |  |  |  |
| Degree of Modification of Maleic Anhydride-modified Ethylene Copolymer (wt %) | 0.12 | 0.12 | 0.12 | 0.12 | 0.12 | 0.12 | 6.0 | 0.12 |
| Layer C: |  |  |  |  |  |  |  |  |
| PA-a[1] (relative viscosity: 6.8) (part) | 100 | 95 | 80 | 80 | 80 | 80 | 80 | 35 |
| PPE[4] (intrinsic viscosity: 0.51 dl/g) (part) | — | 5 | 20 | 20 | 20 | 20 | 20 | 65 |
| Impact Modifier-a[5] (part) | — | 5 | 5 | 30 | 5 | 5 | 15 | 5 |
| Impact Modifier-a[6] (part) | — | 15 | 15 | 40 | 15 | 15 | 4 | 15 |
| Compatibilizer[7] (part) | — | 0.7 | 0.02 | 0.7 | 0.7 | 0.7 | 0.7 | 0.7 |
| PPE Particle Size (μm) | — | 0.10 | 6.5 | 0.60 | 0.15 | 0.15 | 0.15 | 0.65 |
| Blow Mold Temperature (°C.) | 30 | 30 | 30 | 30 | 5 | 30 | 30 | 30 |
| Crystallinity of PA Phase (%) | 40 | 38 | 45 | 15 | 18 | 38 | 14 | 16 |
| Gasoline Permeability (μg) | 0.30 | 1.05 | 1.55 | 1.25 | 1.15 | 0.41 | 1.15 | 1.55 |
| Impact Strength (kgf) | 350 | 1700 | 810 | 1880 | 2150 | 830 | 1350 | 1100 |

Note:
[1]"KANEBO NYLON MC160", nylon 6 produced by Kanebo Ltd.; relative viscosity: 6.8.
[2]"ULTRAMID A4", nylon 66 produced by Badische Anilin & Soda A.G.; relative viscosity: 5.0.
[3]"KANEBO NYLON MC120", nylon 6 produced by Kanebo Ltd.; relative viscosity: 2.5.
[4]Poly(2,6-dimethyl-1,4-phenylene)ether; intrinsic viscosity: 0.51 dl/g or 0.41 dl/g in chloroform at 30° C.
[5]"Cariflex TRKX65", styrene-butadiene-styrene block copolymer produced by Shell Chemical Company Limited; styrene content: 28%; MFR: 1.1 dg/min (190° C., 216 kg).
[6]Maleic anhydride-modified ethylene-propylene copolymer (maleic anhydride content: 0.8%) which was prepared by grafting maleic anhydride to an ethylene-propylene copolymer rubber ("EP941P" produced by Japan Synthetic Rubber Co., Ltd.; Mooney viscosity: 44).
[7]Commercially available maleic anhydride (first class grade) as a compound having an unsaturated group and an amidophilic group per molecule.

It can be seen from the results in Tables 1 and 2 that lamination of (C) a PA/PPE composition having a specific microstructure, (B) a specific unsaturated carboxylic acid-modified polyolefin, and (A) a high-molecular weight polyolefin provides a multi-layer container which is excellent in gasoline impermeability and low-temperature impact resistance.

Having now fully described the invention, it will be apparent to one of ordinary skill in the art that various changes and modifications can be made thereto without departing from the spirit or scope of the invention as set forth herein.

What is claimed is:

1. A low temperature impact resistant multi-layer container which is impermeable to hydrocarbon solvents comprising a layer A comprising a polyolefin resin having a melt flow rate, measured at 190° C. under a load of 2.16 kg, of from 0.001 to 0.02 dg/min, a layer B comprising a modified polyolefin resin modified with a maleic anhydride having a maleic anhydride content of from 0.01 to 5% by weight and a melt flow rate of 0.001 to 20 dg/min, and a layer C comprising a polyamide-based resin composition, wherein said resin composition comprises (C-1) from 40 to 90% by weight of a polyamide resin having a relative viscosity of from 2.0 to 8.0,
(C-2) from 10 to 60% by weight of a polyphenylene ether resin having an intrinsic viscosity of from 0.25 to 0.90 dl/g,
(C-3) from 5 to 50 parts by weight, per 100 parts by weight of the sum of (C-1) and (C-2), of a compatibilizer, an impact modifier, and
(C-4) from 0.05 to 30 parts by weight, per 100 parts by weight of the sum of (C-1) and (C-2), of a compatibilizer, wherein said polyphenylene ether resin forms a dispersed phase having a number average particle size of not more than 1 μm, and said polyamide resin forms a continuous phase and has a crystallinity of at least 20% and wherein said layers A, B, and C are in the order of A/B/C or A/B/C/B/A.

2. A multi-layer container as claimed in claim 1, wherein said polyolefin resin of layer A is an ethylene-based resin having a density of from 0.925 to 0.970 g/cm$^3$.

3. A multi-layer container as claimed in claim 1, wherein said modified polyolefin of layer B is a maleic anhydride-modified ethylene-based resin having a melt flow rate, measured at 190° C. under a load of 2.16 kg, of from 0.001 to 20 dg/min.

4. A multi-layer container as claimed in claim 1, wherein said polyamide resin is nylon 6 or nylon 66.

5. A multi-layer container as claimed in claim 1, wherein said polyphenylene ether resin is poly(2,6-dimethyl-1,4-phenylene) ether having an intrinsic viscosity of from 0.25 to 0.90 dl/g.

6. A multi-layer container as claimed in claim 1, wherein said polyphenylene ether dispersed phase in layer C has a dispersed particle size of from 0.15 to 1 μm.

7. A multi-layer container as claimed in claim 1, wherein said layer A and layer B form a proportion of from 50 to 99% and from 0.1 to 10%, respectively, of the total container wall thickness.

8. A multi-layer container as claimed in claim 1, wherein said compatibilizer is maleic anhydride.

9. A multi-layer container as claimed in claim 1, wherein said impact modifier is a mixture comprising from 20 to 80% by weight of a hydrogenation product of a styrene-butadiene-styrene block copolymer and from 20 to 80% by weight of a maleic anhydride-modified ethylene-propylene copolymer elastomer.

10. A multi-layer container as claimed in claim 1, wherein said container is a gasoline tank.

11. A multi-layer container as claimed in claim 10, wherein said gasoline tank is composed of layer A having a thickness of from 3 to 8 mm, layer B having a thickness of from 4 μm to 2 mm, and layer C having a thickness of from 40 μm to 3 mm.

* * * * *